United States Patent [19]
Dennis, Jr.

[11] Patent Number: 5,148,582
[45] Date of Patent: Sep. 22, 1992

[54] QUICK RELEASE CORD STRAP SYSTEM
[76] Inventor: David B. Dennis, Jr., 959 Chalcedony St., #5, San Diego, Calif. 92109
[21] Appl. No.: 741,913
[22] Filed: Aug. 8, 1991
[51] Int. Cl.⁵ .............................................. A44B 11/25
[52] U.S. Cl. ..................................... 24/625; 24/590; 24/615
[58] Field of Search ............. 24/625, 616, 618, 136 L, 24/129, 598.9, 116 A, 573.1, 615, 613; 411/78, 165; 272/75; 5/83

[56] References Cited
U.S. PATENT DOCUMENTS

| | | | |
|---|---|---|---|
| 77,608 | 5/1868 | Hale et al. | 24/615 |
| 195,164 | 9/1877 | Pope | 24/590 |
| 1,016,260 | 2/1912 | Fuchs | 24/579 |
| 2,195,997 | 4/1940 | Perkins | 403/165 |
| 3,251,109 | 5/1966 | Wilson et al. | 24/590 |
| 3,865,437 | 2/1975 | Crosby | 403/165 |
| 4,080,782 | 3/1978 | Colecchio | 403/165 |
| 4,110,873 | 9/1978 | Nerchere | 24/618 |
| 4,150,464 | 4/1979 | Tracy | 24/615 |
| 4,559,679 | 12/1985 | Downey | 24/573.1 |
| 5,024,548 | 6/1991 | Timmington | 403/165 |

OTHER PUBLICATIONS

Nexus Catalog, p. 3, No date, No Specification.

Primary Examiner—Victor N. Sakran
Attorney, Agent, or Firm—Zegeer, Jim

[57] ABSTRACT

A quick release strap system comprising,
a molded plastic quick release male or female buckle component, a base and a conical aperture in the base coaxial with the center line, and an annular bearing shoulder formed interiorly of the base and coaxial with the conical aperture. The conical aperture receives a swivel connector having at least a pair of spring cam surface fingers adapted to be cammed toward one another by the conical aperture and a bearing ledge formed on the spring cam fingers contiguous to the cam surfaces and engagable with the annular shoulder bearing surface after the spring cam surfaces have passed the conical aperture. A strap having a pair of ends and means securing said one end of said pair of ends to said swivel connector opposite said spring cam finger.

3 Claims, 2 Drawing Sheets

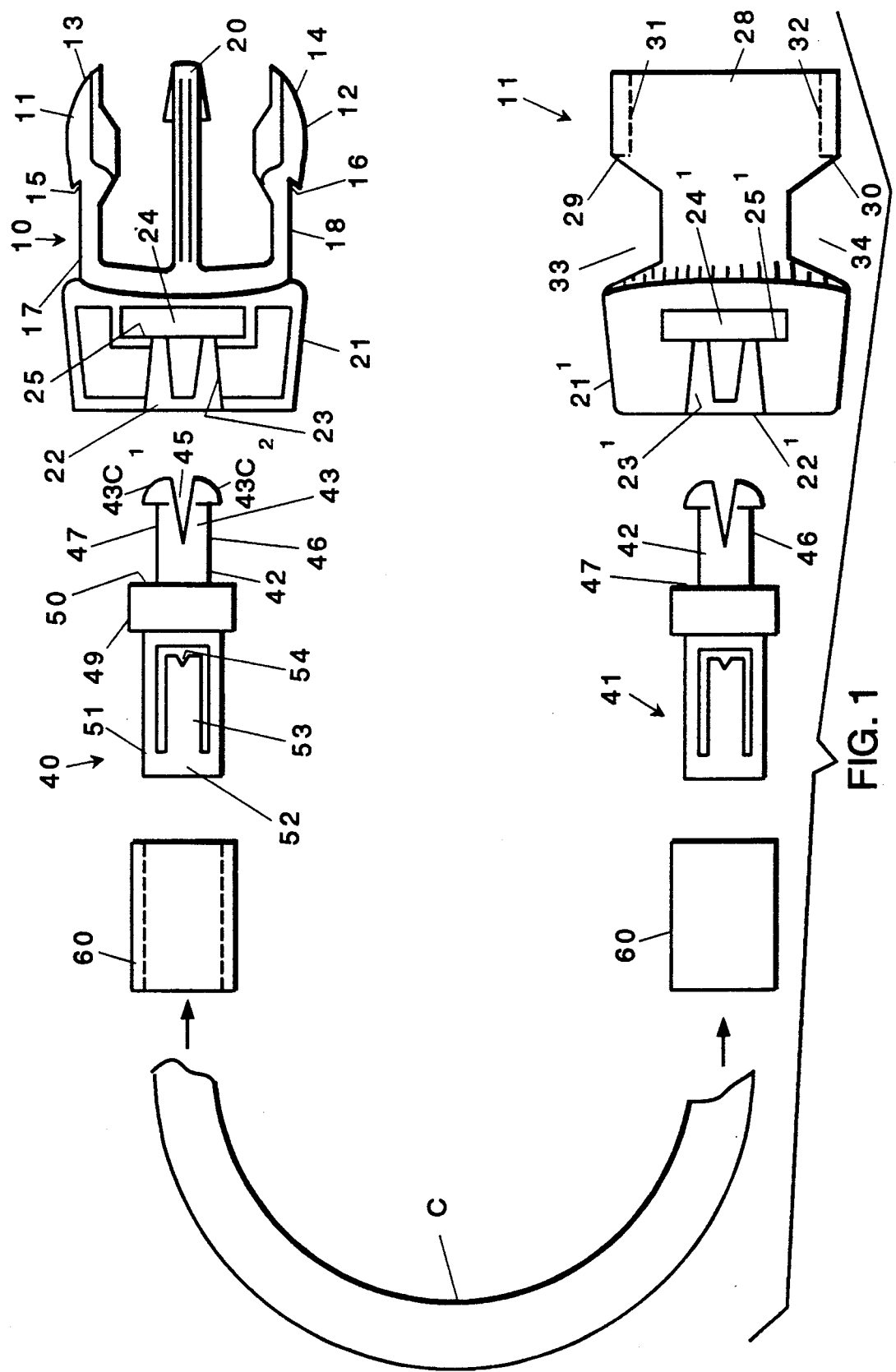

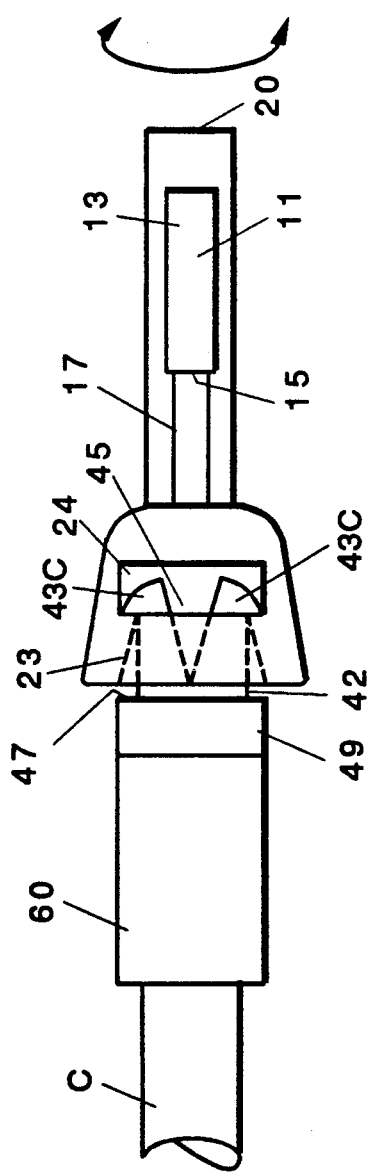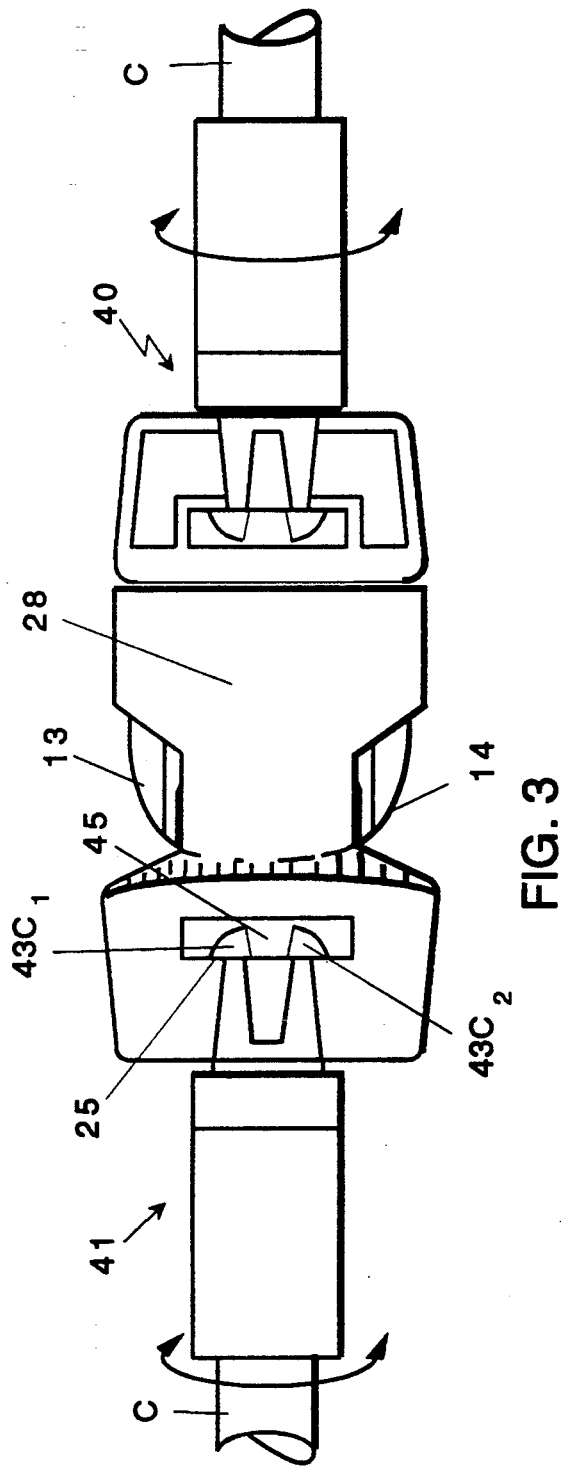

QUICK RELEASE CORD STRAP SYSTEM

BACKGROUND AND BRIEF DESCRIPTION OF THE INVENTION

This invention relates generally to a quick release strap system in which quick release buckles have quick connect swivel connectors for cords and the like associated therewith.

Side release buckles and strap systems which are particularly adapted for buckling and releasably joining two ends of a flat belt or the like and includes means for adjusting the length of the belt are well known in the art. See Canadian Patent 1,064,226 and Canadian Patent 1,093,285 and U.S. Pat. Nos. 3,167,835, and 4,150,464. In these prior art buckle arrangements, belt end termination members of various kinds for adjusting the length of the belt looped through the slide member are provided along with clasp members for securing the belt in an adjusted position. They do not accept cords or round straps.

The object of the present invention is to provide an improved strap system in which quick release buckles are coupled with swivel coupling elements to round cords in a flexible and versatile cord strap system.

The cord attachment according to the invention incorporates the convenience of side release buckles currently used in combination with nylon webbing with a cord (shock cord, polyurethane, monofilament, nylon rope, etc.) to be used as an interchangeable alternative or substitute for nylon webbing applications and incorporate the use of side release buckles. Advantages of the present quick release buckle and cord and the swivel means incorporated with the unit which prevents cord twisting problems (for example, it can be used with jump ropes, dog leashes, surf leashes and the like). The invention eliminates the extra time and effort required to "hook" and "unhook" a hook. In an emergency situation this extra time and effort could prove costly.

The invention is preferably made of molded plastic parts which are easily assembled requiring no tools for assembly. It allows for quick interchange for different types, sizes and lengths of cord and provides a means by which the ends of different cords or the same cord can be quickly connected or disconnected. Straps incorporating the present invention can be used in tie-down applications and the invention provides cosmetic and design advantages over nylon webbing currently used in side release buckle applications.

DETAILED DESCRIPTION OF THE DRAWINGS

The above and other objects, advantages and features of the invention will become more apparent when considered with the following specification and accompanying drawings wherein:

FIG. 1 is an exploded view of the different components making up the invention,

FIG. 2 is a side elevational view of the male component and cord swivel mount head, and FIG. 3 is a top plan view illustrating the invention in its assembled form and with the male and female quick release components in engagement.

DETAILED DESCRIPTION OF THE INVENTION

Referring to FIG. 1, element 10 is a male component of a slide release buckle of the type illustrated in the above-referenced patents, and is comprised of an integrally molded member having a pair of spring arm fingers 11 and 12 having camming surfaces 13 and 14, and hook or latch elements 15 and 16 on spring arms 17 and 18. A central, relatively rigid guide arm 20 projects between the spring arms 17 and 18 and is received in a complementary guide channel (not shown) in the female component. The enlarged base 21 has an aperture 22 having conical camming surface 23 leading to an open space 24 defining an annular shoulder 25. Element 11 is a female component of a side release buckle containing a female swivel mount aperture corresponding to the aperture 23 as described in connection with the male component 10 and corresponding numbers have been appropriately primed.

The female component 11 has an aperture 28, which receives the spring arms 17 and 18, and latching shoulders 29 and 30 so that when the camming surfaces 13 and 14 engage sides 31 and 32 of aperture 28, the latch members 11 and 12 are cammed inwardly and as the male elements is protected in further, the latch elements 15 and 16 slide past shoulders 29 and 30 and spring outwardly to latch the two components together by virtue of the hook 15 engaging shoulder 29 and hook 16 engaging shoulder 30. Cut-outs 33 and 34 on the sides of the female member allows manual squeezing-in of spring fingers 17 and 18 by virtue of grasping cam surfaces 11 and 12 and squeezing them in inwardly to disengage the hooks 15 and 16 from shoulders 29 and 30, respectively, so that the male component may be pulled away and disengaged from the female component.

Cord mount swivel heads 40 and 41 are identical and include an upstanding swivel post 42 which has an enlarged split mushroom head 43 providing a bearing surface 44. The post 42 is bifurcated by a pair of crossed "V" notches 45 to form pairs of spring arms 46, 47. An enlarged annular member 49 has a stop shoulder 50 thereon. In use, post 42 is inserted into conical aperture 22 and as it is pressed into the conical aperture, cam surfaces 43C1 and 43C2 coact with the conical aperture 23 to cause the shoulders 44 to bear inwardly and, when free of the edge defining annular shoulder 25, spring outwardly to form the swivel connection between the cord mount swivel head 40 and the male component 10 allowing free rotation and secure coupling between the male or female components and the cord swivel mounts. A similar arrangement pertains with respect to cord mount swivel head 41 and the female component of the side release buckle 11.

Each of the cord mount swivel heads 40 and 41 are connected to the ends of cord C. Each of the mount swivel heads includes a shank portion 51 which has an axial bore 52 having an inside diameter corresponding to but slightly larger than the diameter of cord C so that the cord C may be inserted snugly into bore 52. Sidewalls of bore 52 have spring fingers 53 which have small burrs 54 on the ends thereof for engaging the external surfaces of cord C which has been forced into bore hole 52. A cord mount sleeve 60 is slid over the post 51 and forces the spring fingers 53 into snug abutment with the external surfaces of cord C thereby retaining the cord C in the cord mount swivel head. A similar arrangement applies with respect to cord mount swivel head 41.

FIG. 3 illustrates the full assembled cord with the male and female elements in engagement. The arrows indicate the free rotation of the cord and cord mount swivel heads relative to the male and female components of the side release buckles.

It will be appreciated that the side release buckle is standard when used with nylon webbing and that other forms of quick release male and female buckles may be used.

The invention allows a cord (a shock cord, polyurethane, monofilament, nylon rope, etc.) to be used as an interchangeable alternate or substitute for nylon webbing applications and incorporate the use of side release buckles. The swivel feature of the invention prevents cord twisting problems (for example, in jump ropes, dog leashes, and surf leashes). It eliminates the extra time and effort required to "hook" and "unhook" a hook and in an emergency situation this extra time and effort could be dangerous as, for example, in the case of a surfboard leash.

The product requires no tools for assembly and it allows for quick interchange of different types, size and lengths of cord. It provides a means by which the ends of different cords or the same cord can be quickly connected or disconnected for example to tie-on a surfboard on a roof of a car or other equipment on the roof of a car. It can be used for tie-down applications.

While a preferred embodiment of the invention has been shown and described, it is obvious that various changes, modifications and adaptations may occur to those skilled in the art and it is intended that such changes, adaptations and modifications be encompassed within the spirit and scope of the claims appended hereto.

What is claimed is:

1. A quick release strap system comprising:
   a first molded plastic quick release male buckle component having a center line, a base and a conical aperture in said base coaxial with said center line, and an annular bearing shoulder formed interiorly of said base and coaxial with said conical aperture,
   a second molded plastic quick release female buckle component having a center line, a base and a conical aperture in said base coaxial with said center line, and an annular shoulder formed interiorly of said base and coaxial with said conical aperture,
   a pair of molded plastic swivel connectors, each molded plastic swivel connector having at least a pair of spring cam surface fingers adapted to be cammed toward one another by said conical aperture and a bearing ledge formed on said spring cam fingers contiguous to said cam surfaces and engagable with said annular shoulder bearing surface after said spring cam surfaces have passed one of said conical apertures, respectively, and
   a strap having a pair of ends and means securing respective ones of said pair of ends to one of said swivel connectors opposite said spring cam fingers, respectively.

2. The quick release strap system defined in claim 1 wherein said side release buckle component is a male-type, and a complementary female-type buckle component secured to the opposite end of said strap.

3. A quick release strap system comprising:
   a molded plastic quick release buckle component having a center line, a base and a conical aperture in said base coaxial with said center line, and an annular bearing shoulder formed interiorly of said base and coaxial with said conical aperture,
   molded plastic swivel connector having at least a pair of spring cam surface fingers adapted to be cammed toward one another by said conical aperture and a bearing ledge formed on said spring cam fingers contiguous to said cam surfaces and engagable with said annular shoulder bearing surface after said spring cam surfaces have passed said conical aperture, and
   a strap having a pair of ends and means securing one end of said pair of ends to said swivel connector opposite said spring cam finger, and wherein said strap is circular in cross-section, and said means securing said one end of said pair of ends, includes a circular bore in said swivel connector at least one spring finger formed in a wall of said circular bore, said spring finger including one or more strap penetrating barbs which is cammed away from said bore by insertion of said circular on cross-section strap, and band means urging said one or more barbs into said circular cross-section strap to secure same in said bore hole.

* * * * *